(12) United States Patent
Yu et al.

(10) Patent No.: US 8,347,725 B2
(45) Date of Patent: Jan. 8, 2013

(54) OIL PRESSURE SENSOR

(75) Inventors: San-Chuan Yu, Changhua County (TW); Yu-Shun Lin, Changhua County (TW); Chih-Wei Yen, Changhua County (TW)

(73) Assignee: Cub Elecparts Inc., Changhua County (TW)

( * ) Notice: Subject to any disclaimer, the term of this patent is extended or adjusted under 35 U.S.C. 154(b) by 190 days.

(21) Appl. No.: 13/022,673

(22) Filed: Feb. 8, 2011

(65) Prior Publication Data

US 2012/0198940 A1    Aug. 9, 2012

(51) Int. Cl.
*G01L 9/00*    (2006.01)

(52) U.S. Cl. ............................................. 73/723; 73/717

(58) Field of Classification Search ..................... None
See application file for complete search history.

(56) References Cited

U.S. PATENT DOCUMENTS 7,997,141 B1 *    8/2011    Lo .................................. 73/706

* cited by examiner

*Primary Examiner* — Andre Allen
(74) *Attorney, Agent, or Firm* — Muncy, Geissler, Olds & Lowe, PLLC

(57) ABSTRACT

An oil pressure includes a housing, a pressure sensing unit mounted in the housing and a first signal generator. Because the pressure sensing unit is provided with a pusher and an elastic piece that is able to uniformly receive a force exerted from the pusher such that the pusher can uniformly drive a swing member of the first signal generator, the oil pressure sensor can output an accurate oil pressure signal.

6 Claims, 9 Drawing Sheets

OIL PRESSURE SENSOR

BACKGROUND OF THE INVENTION

1. Field of the Invention

The present invention relates generally to a pressure sensor and more particularly, to an oil pressure sensor.

2. Description of the Related Art

FIG. 1 and FIGS. 2A and 2B show an oil pressure sensor of a prior art. The sensor, denoted by reference numeral 1, mainly comprises a housing 10, a pressure sensing unit 11, a first signal generator 13, a second signal generator 15, a first signal outputting member 17 and a second signal outputting member 19. The pressure sensing unit 11 includes a top cover 112 having an oil inlet 111, a base case 113 connected with and located beneath the top cover 112, a flexible diaphragm 114 disposed between the top cover 112 and the base case 113, an intermediate cap 115, a pusher 116 and a coil spring 117.

When the oil is introduced into the sensor through the oil inlet 111, the center portion of the flexible diaphragm 114 will downwardly deform due to the oil pressure and then push the intermediate cap 115 and in turn the pusher 116 to make the intermediate cap 115 and the pusher 116 compress the coil spring 117 and at the same time make the pusher 116 drive a crank 131 of the first signal generator 13 to swing and scrape on a coil member 133. As a result, an oil pressure signal is outputted through the first signal outputting member 17 that is electrically connected with the first signal generator 13. In the mean time, as shown in FIG. 3, a straight rod 151 of the second signal generator 15 is pressed to move downwardly, such that the oil pressure signal is outputted through the second signal outputting member 19 that is electrically connected with second signal generator 15.

The above-mentioned conventional oil pressure sensor has several drawbacks that will adversely affect the accuracy of the oil pressure signal. For example, because the spiral structure of the coil spring 117 can not uniformly receive the force exerted by the pusher 116, i.e. the coil spring 117 can not uniformly support the pusher 116 under movement, the pusher 116 tends to inclinedly and unevenly push the first and second signal generators 13 and 15, resulting in inaccurate oil pressure signal output. Further, the crank 131 of the first signal generator 13 is contacted with the pusher 116 by its bent portion 135 merely. This contact mechanism is barely stable and the bottom surface of the pusher 116 tends to be worn due to the scrape of the bent portion 135 of the crank 131, causing inaccurate oil pressure signal output. Furthermore, since the crank 131 and the straight rod 151 need to be contacted to the bottom surface of the pusher 116 at one time, both of them can not be simultaneously stopped at the geometric center of the bottom surface of the pusher, which is the optimum force-applying position of the pusher 116, thereby affecting the accuracy of the oil pressure signal.

SUMMARY OF THE INVENTION

The present invention has been accomplished in view of the above-noted circumstances. It is therefore the primary object of the present invention to provide an oil pressure sensor that can improve the above-mentioned drawbacks.

To achieve the above-mentioned object, an oil pressure sensor provided by the present invention comprises a housing, a pressure sensing unit mounted in the housing, a first signal generator and a first signal outputting member. The pressure sensing unit includes a top cover, a base case connected with the top cover to define with the top cover an accommodation therebetween, a flexible diaphragm disposed in the accommodation, a pusher abutted with the flexible diaphragm, and an elastic piece pushable by the pusher. The pusher has a head abutted with the flexible diaphragm and a tail passing through the elastic piece. The first signal generator includes a coil member mounted to the base case and a swing member contacted with the coil member and pushable by the tail of the pusher to curvedly slide on the coil member. The first signal outputting member is electrically connected with the coil member for outputting a signal corresponding to oil pressure.

The elastic piece of the oil pressure sensor of the present invention can uniformly receive a force exerted from the pusher, such that the pusher can be held in an upright posture and uniformly push the swing member of the first signal generator. As a result, an oil pressure signal outputted by the oil pressure sensor of the present invention can be more accurate.

In a preferred embodiment of the oil pressure sensor, the elastic piece of the pressure sensing unit comprises a through hole through which the tail of the pusher passes, and a plurality of slits in communication with the through hole, such that the elastic piece can uniformly support the pusher to facilitate the pusher to stably move up and down.

In a preferred embodiment of the present invention, the swing member of the first signal generator may comprise a cam pivotally connected with the base case, and an arm mounted to the cam and contacted with the coil member. When the cam is pushed by the tail of the pusher to swing, the arm will curvedly slide on the coil member, such that a signal corresponding to the oil pressure can be generated.

In addition, the swing member may further comprise a coil spring sleeved on a pivot of the cam and provided with a first leg connected to the base case and a second leg connected to the arm such that the cam can return to an initial position upon release of an external force exerting on the cam by the pusher.

The oil pressure sensor of the present invention may further comprise a second signal generator having an electrical contact disposed at the base case and an electrically conductive leaf spring disposed at the base case and pushable by the pusher to contact the electrical contact.

In addition, the oil pressure sensor of the present invention further comprises a second signal outputting member that is electrically connected with the second signal generator for outputting a signal corresponding to oil pressure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
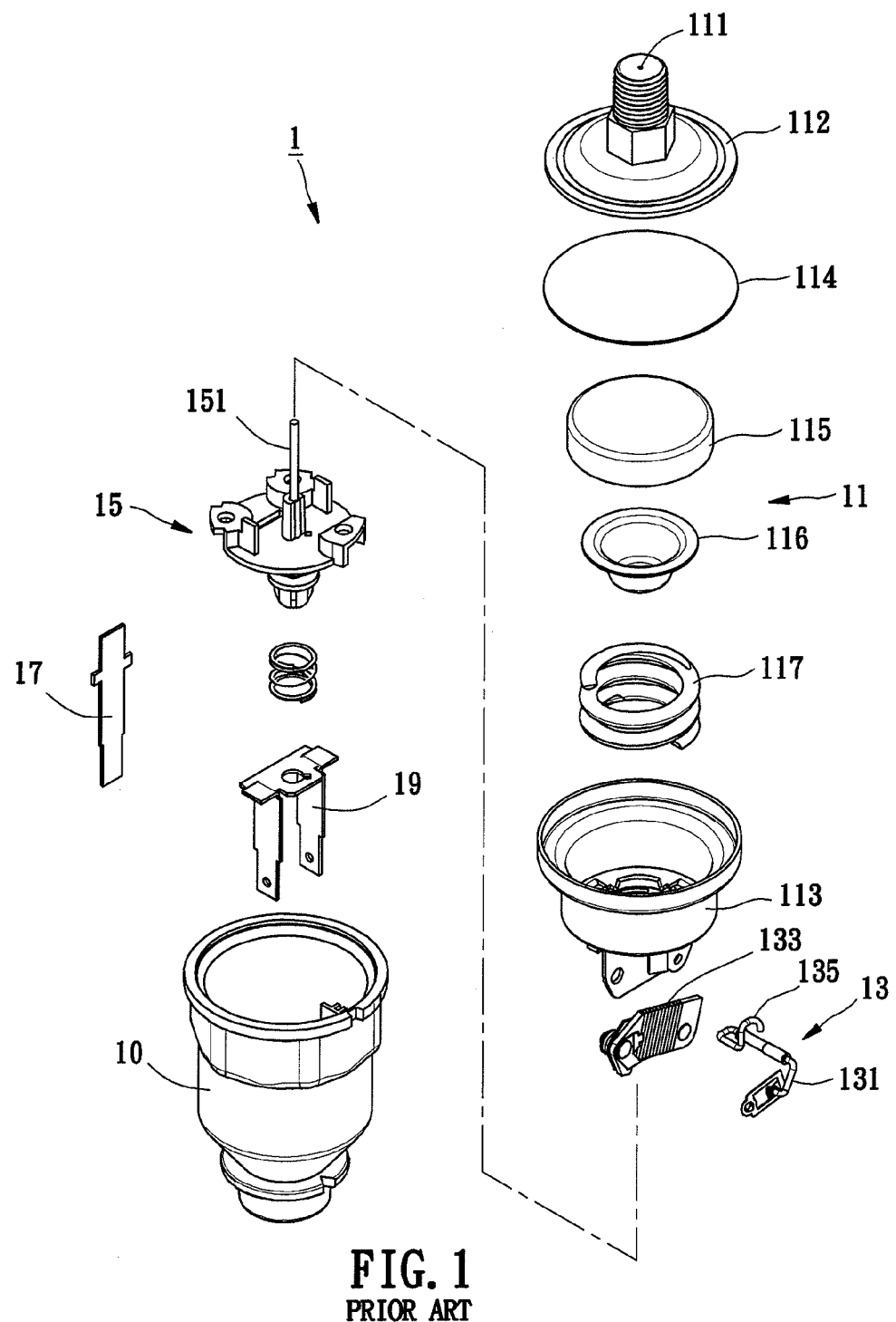
FIG. 1 is an exploded view of an oil pressure sensor according to a prior art.
Figure 2A:
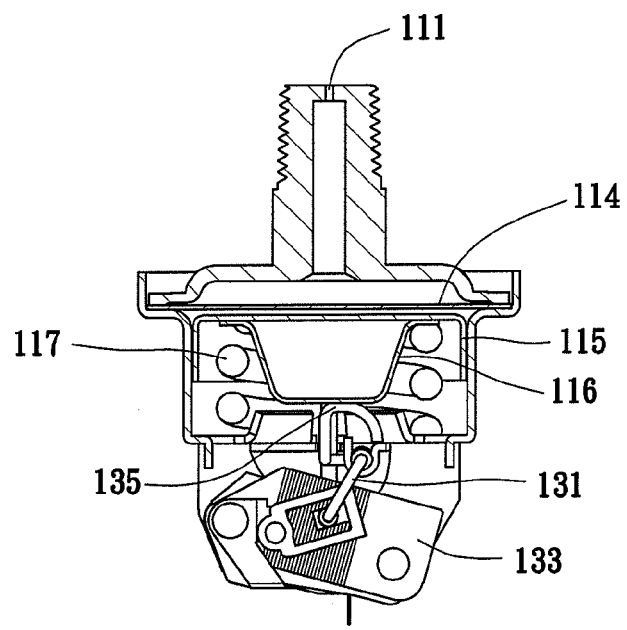
FIG. 2A is a cross-sectional view of the oil pressure sensor according to the prior art, showing that the flexible diaphragm is not deformed.
Figure 2B:
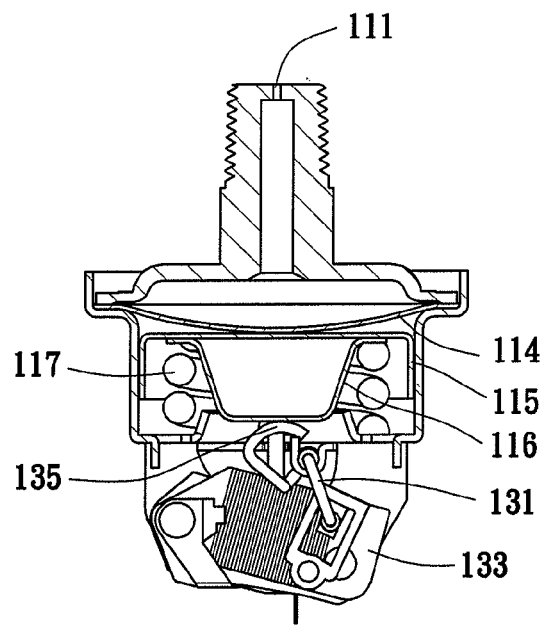
FIG. 2B is similar to FIG. 2A but showing that the flexible diaphragm is deformed due to oil pressure.
Figure 3:
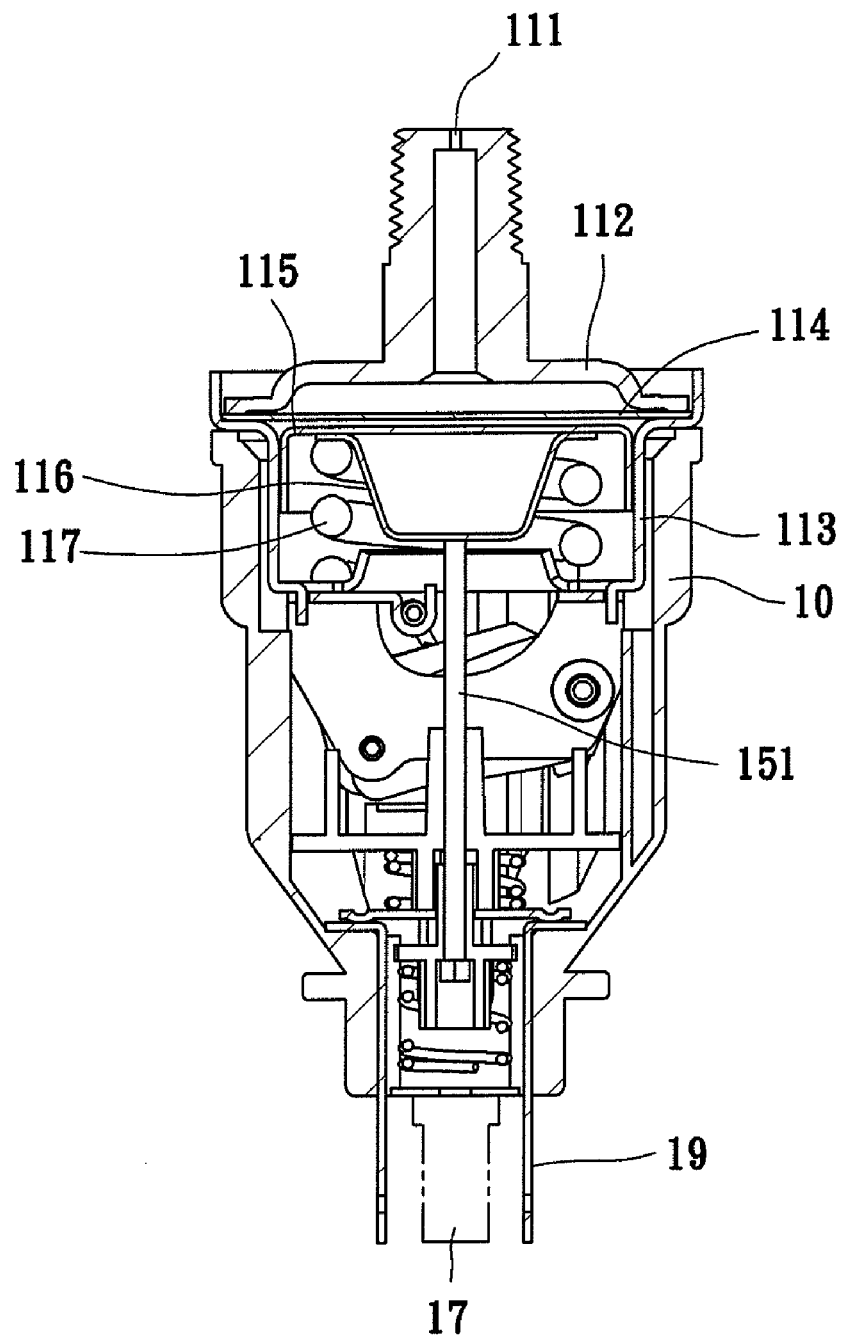
FIG. 3 is another cross-sectional view of the oil pressure sensor according to the prior art.
Figure 4:
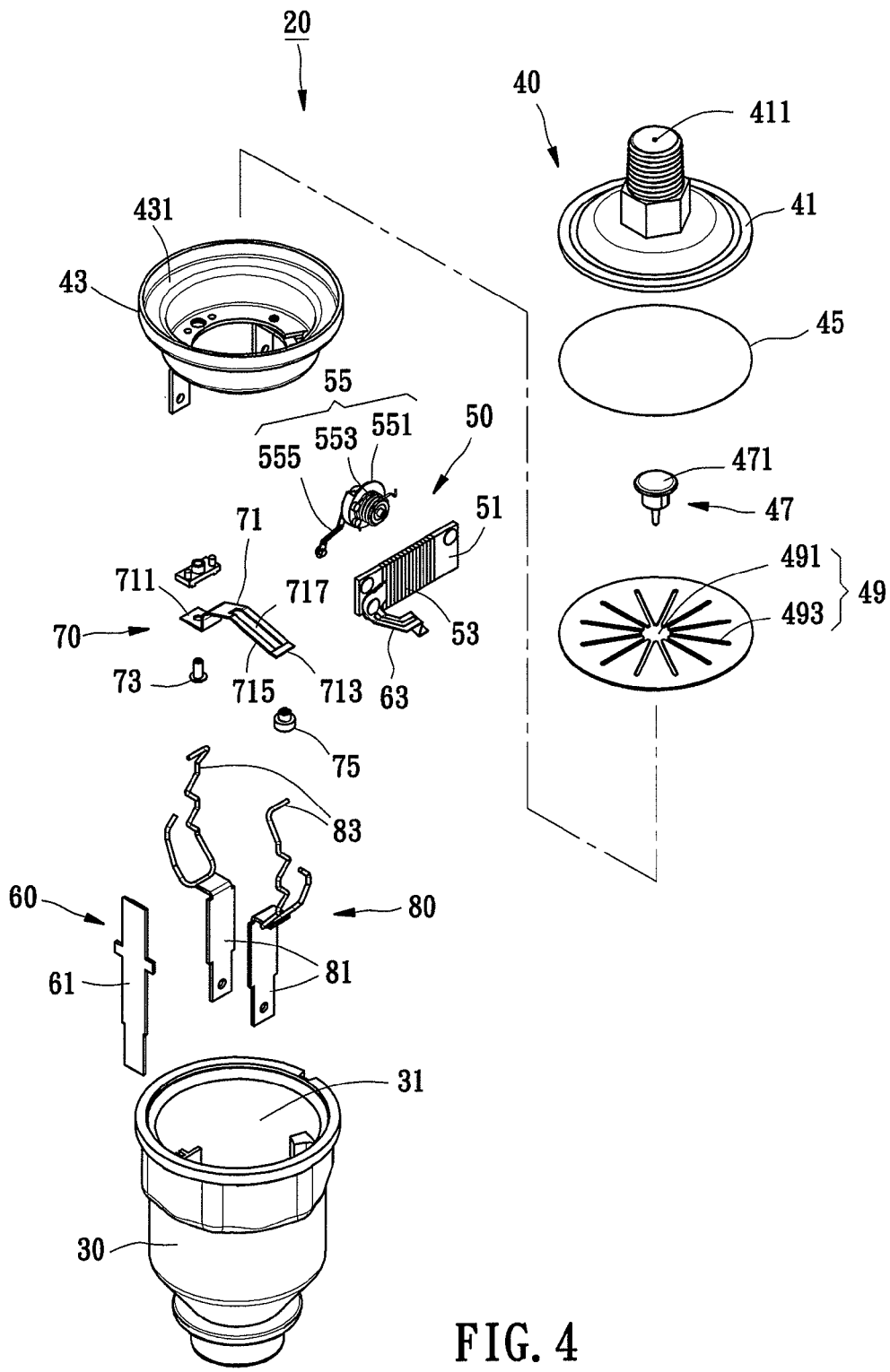
FIG. 4 is an exploded view of an oil pressure sensor according to a preferred embodiment of the present invention.
Figure 5:
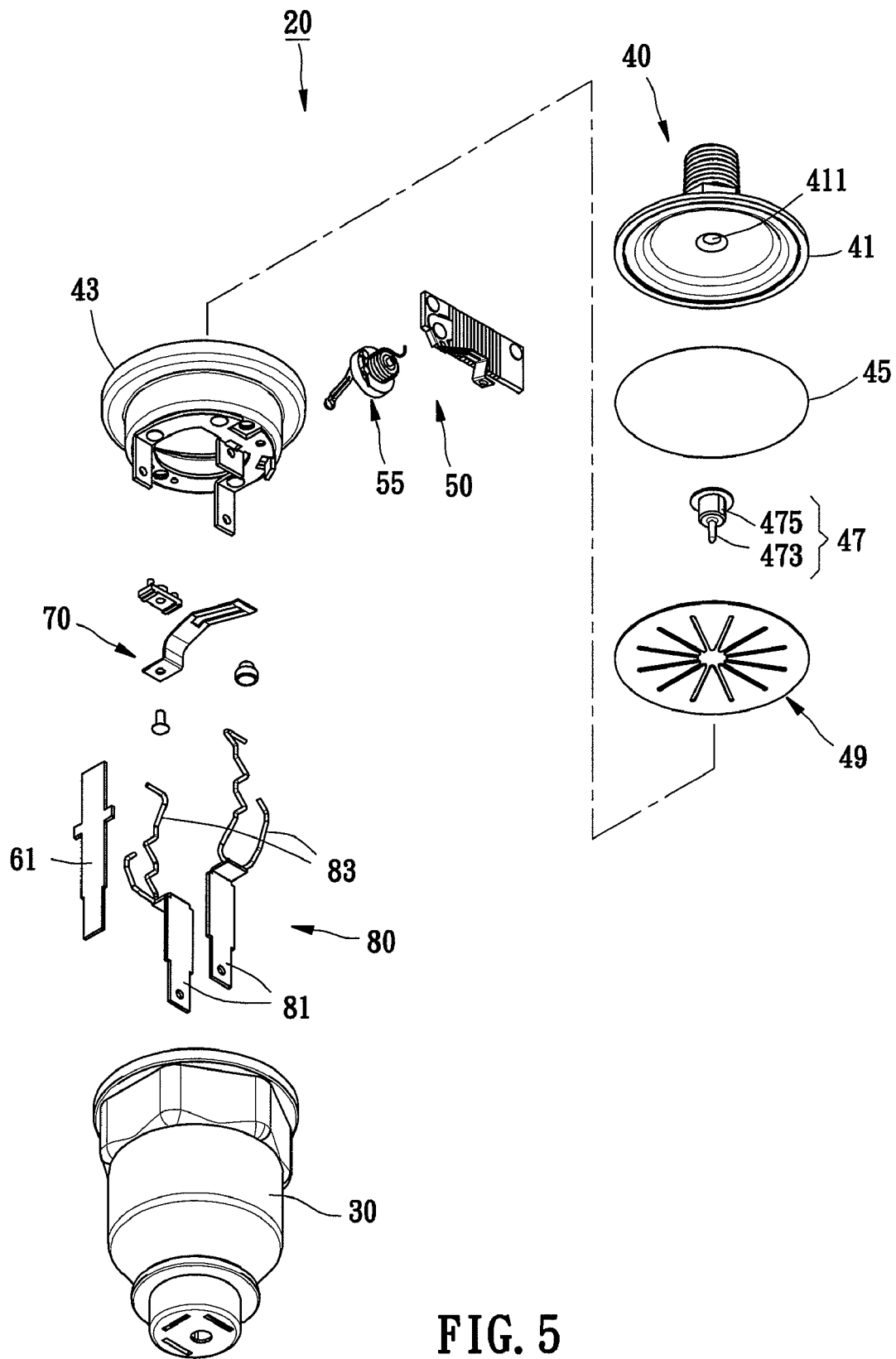
FIG. 5 is another exploded view of the oil pressure sensor according to the preferred embodiment of the present invention when viewed from another angle.

Referring to FIG. 4 to FIG. 8, an oil pressure sensor 20 provided by a preferred embodiment of the present invention mainly comprises a housing 30, a pressure sensing unit 40, a first signal generator 50 and a first signal outputting member 60.

The housing 30 is shaped like a cylinder provided at an inside thereof with a receiving space 31 for accommodating the first signal generator 50 therein.

The pressure sensing unit 40 is mounted in the housing 30 and includes a top cover 41, a base case 43, a flexible diaphragm 45, a pusher 47 and an elastic piece 49. The top cover 41 has a disc and an oil inlet tube 411 integrally extending from the disc. The base case 43 has an annular shoulder 431 and an annular fringe connected with the top cover 41 in such a way that an accommodation 42 is formed between the base case 43 and the top cover 41. The flexible diaphragm 45 is mounted inside the accommodation 42 beneath the bottom of the top cover 41. The pusher 47 includes a head 471 abutted with the flexible diaphragm 45, a tail 473 passing through the elastic piece 49, and a body 475 integrally connected between the head 471 and the tail 473. The elastic piece 49 has a through hole 491 through which the body 475 and the tail 473 pass, and a plurality of radially arranged slits 493 in communication with the through hole 491. In this way, when the elastic piece 49 receives a pushing force exerted from the pusher 47, the elastic piece 49 can uniformly support the pusher 47 for facilitating the pusher 47 to smoothly and stably move up and down.

Figure 6A:
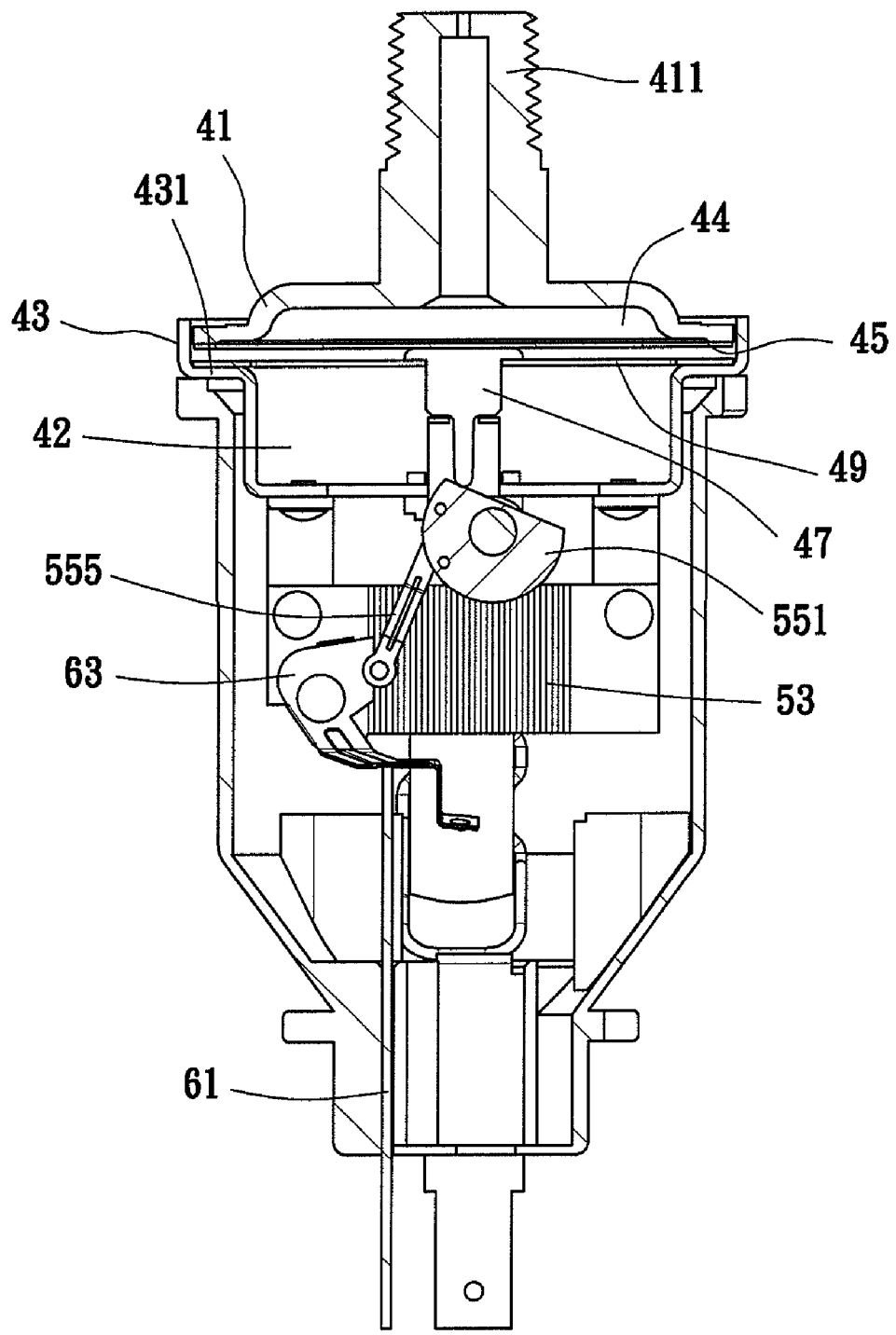
FIG. 6A is a cross-sectional view of the oil pressure sensor according to the preferred embodiment of the present invention, showing that the flexible diaphragm is not deformed.

In assembly, as shown in FIG. 6A, the annular edge of the elastic piece 49 is supported on the shoulder 431 of the base case 43, the head 471 of the pusher 47 is located between the flexible diaphragm 45 and the elastic piece 49, and the top cover 41 has a center portion spaced from the flexible diaphragm 45 at a predetermined distance such that an oil chamber 44 is formed between the oil inlet tube 411 and the flexible diaphragm 45.

Figure 6B:
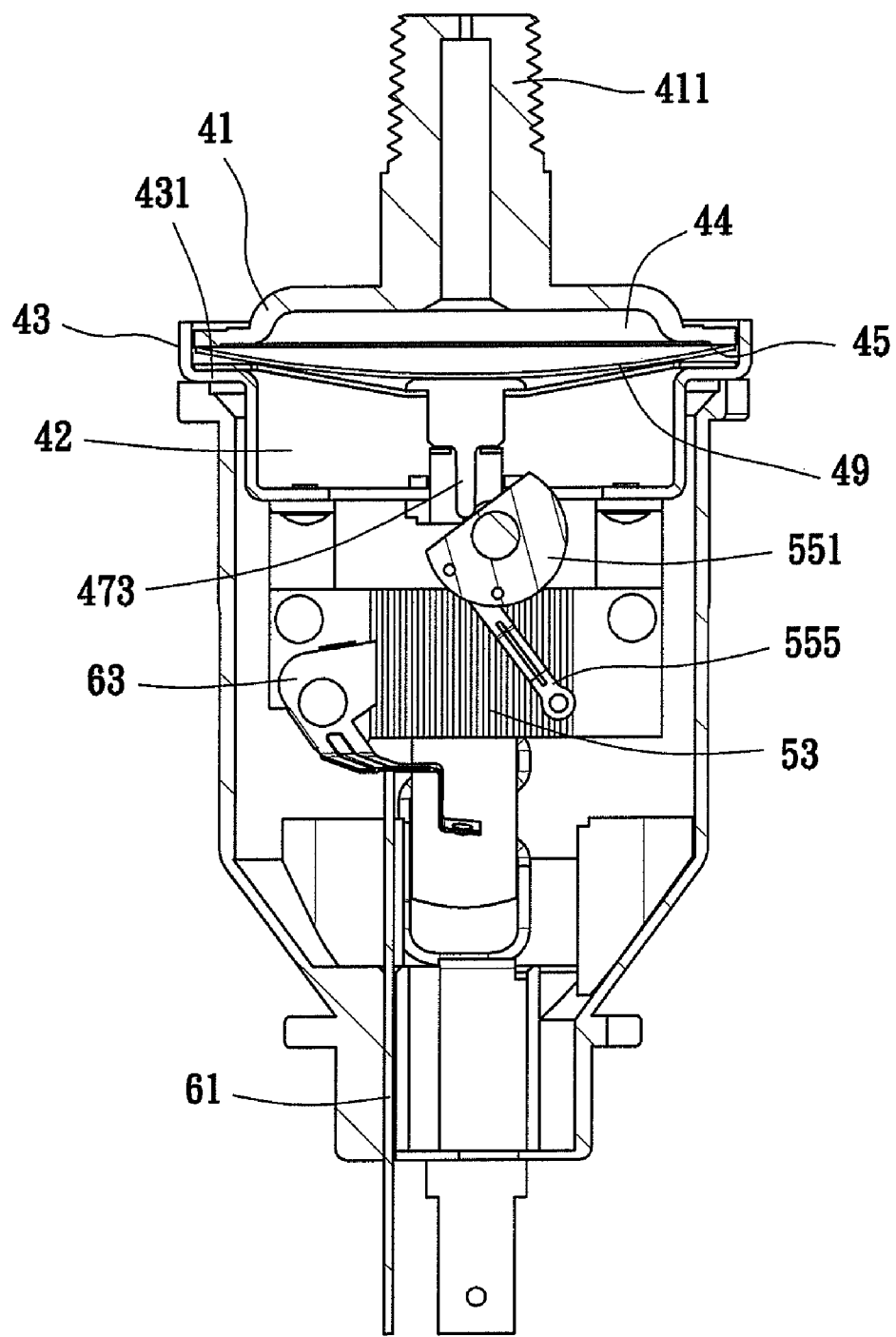
FIG. 6B is similar to FIG. 6A but showing that the flexible diaphragm is deformed due to oil pressure.
Figure 7:
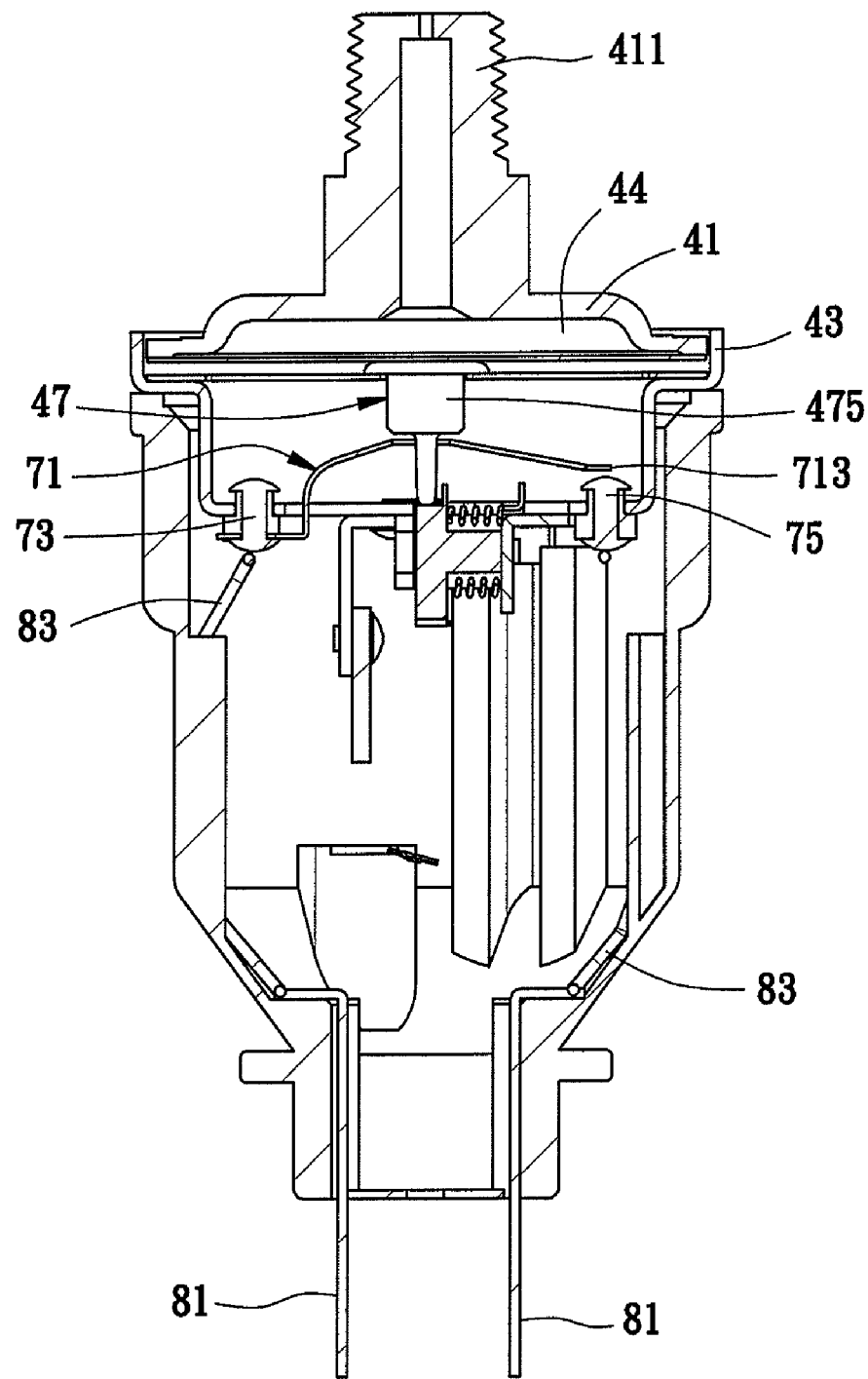
FIG. 7 is another cross-sectional view of the oil pressure sensor according to the preferred embodiment of the present invention.
Figure 8:
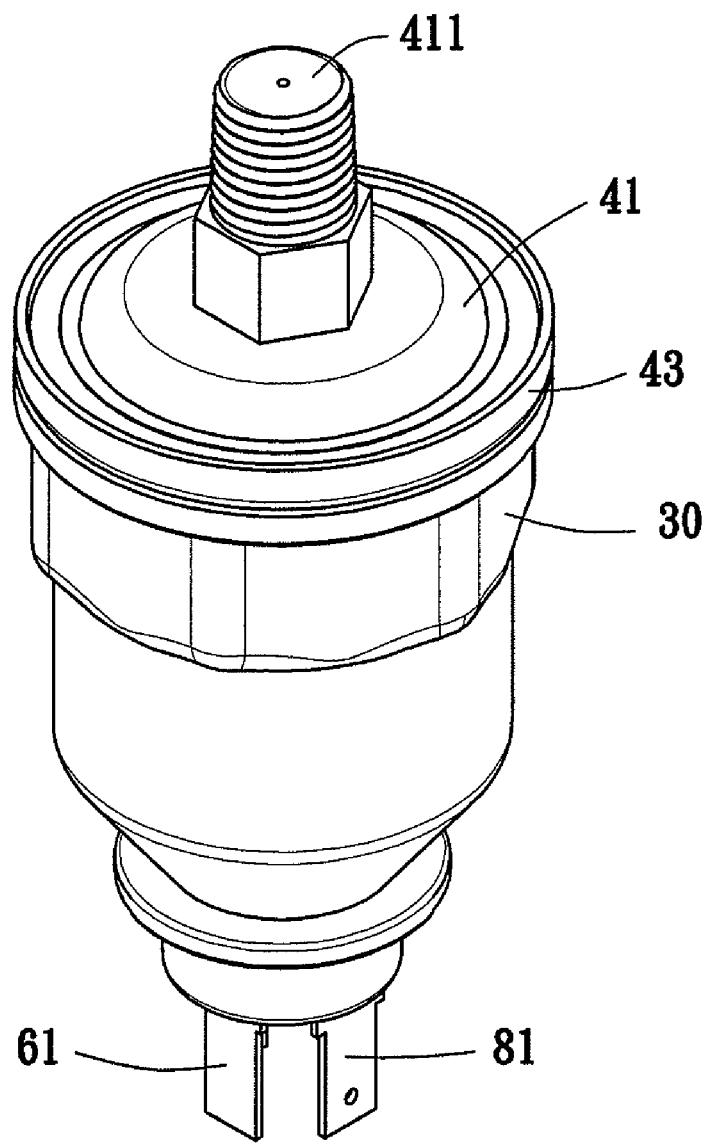
FIG. 8 is a perspective view of the oil pressure sensor according to the preferred embodiment of the present invention.

The first signal generator 50 is connected with the base case 43 of the pressure sensing unit 40 and located inside the receiving space 31 of the housing 30. The first signal generator 50 includes an electrically insulated plate 51 mounted to the base case 43, a coil member 53 wound around the insulated plate 51, and a swing member 55 in contact with the coil member 53. Specifically speaking, the swing member 55 includes a cam 551 having a pivot pivotally connected with the base case 43, a coil spring 553, and an arm 555 having an end fixedly connected to the cam 551 and the other end in contact with the coil member 53. The coil spring 553 is sleeved onto the pivot of the cam 551 and provided with a first leg connected to the base case 43, and a second leg connected to the arm 555. In this way, when the pusher 47 moves downwardly, the tail 473 of the pusher 47 will push the cam 551 to swing at a predetermined angle, resulting in that the arm 555 will swing along with the cam 551 to slide on the coil member 53, as shown in FIG. 6B. On the other hand, when the external force exerting on the cam 551 by the tail 473 of the pusher 47 is released, the cam 551 will return to the initial position, as shown in FIG. 6A, due to the rebound force of the coil spring 553. By this way, the more the force exerts on the cam 551, i.e. the more the distance is traveled by the arm 555 on the coil member 53, the greater the value of the resistance correlating to the value of the oil pressure signal can get. In other words, the less the force exerts on the cam 551, i.e. the less the distance is traveled by the arm 555 on the coil member 53, the smaller the value of the resistance correlating to the value of the oil pressure signal can get.

The first signal outputting member 60 is formed, in this preferred embodiment, of an elongated metal strip 61 and a curved conductive piece 63 having an end mounted to the insulated plate 51 and contacted with the coil member 53, and the other end contacted with the metal strip 61 for outputting the oil pressure signal generated by the first signal generator 50.

When the oil has not been introduced into the oil chamber 44, the flexible diaphragm 45, the pusher 47, the elastic piece 49, the cam 551 and the arm 555 will rest at positions as shown in FIG. 6A. When the oil is introduced into the oil chamber 44, because of the oil pressure, the center portion of the flexible diaphragm 45 will downwardly deform to push the pusher 47, such that the tail 473 of the pusher 47 will synchronously push the cam 551 to swing, resulting in that the arm 555 will slide on the coil member 53. As a result, a signal corresponding to the magnitude of the oil pressure will be generated and then outputted through the conductive piece 63 and the metal strip 61.

As indicated above, the elastic piece 49 of the oil pressure sensor 20 of the present invention can uniformly receive the force exerted by the pusher 47, such that the pusher 47 can be held by the elastic piece 49 in an upright posture when the pusher is actuated by the flexible diaphragm 45 to push the swing member 55 of the signal generator 50. Accordingly, an accurate oil pressure signal can be obtained.

Referring to FIGS. 4 and 5 again, the oil pressure sensor 20 further comprises a second signal generator 70 and a second signal outputting member 80 electrically connected with the second signal generator 70.

The second signal generator 70 includes an electrically conductive leaf spring 71 having a first end 711 mounted to the bottom of the base case 43 through a rivet 73, a second end 713 disposed inside the accommodation 42 and elastically contactable with a rivet 75 mounted to the base case 43 and served as an electrical contact, and a middle portion 715 provided with a slot 717 through which the tail 473 of the pusher 47 passes. In this way, when the pusher 47 is forced to move downwardly, the body 475 will push the middle portion 715 of the electrically conductive leaf spring 71 to force the second end 713 to contact the rivet 75, i.e. the electrical contact. In addition, the second signal outputting member 80 includes two elongated metal strips 81 spacedly mounted with the housing 30, and two conductive rods 83 electrically connected between the strips 81 and the rivets 73 and 75 respectively.

In practical operation of the oil pressure sensor 20 of the present invention, when the pusher 47 is not forced to move, the second end 713 of the electrically conductive leaf spring 71 is spaced above the rivet (electrical contact) 75, and no oil pressure signal is generated accordingly. When oil is introduced into the oil chamber 44, the pusher 47 will be forced by the flexible diaphragm 45 to move downwardly, and at the same time the body 475 of the pusher 47 will push the electrically conductive leaf spring 71 to make the second end 713 contact the rivet (electrical contact) 75, such that the two rivets 73 and 75 are electrically conducted for enabling an oil pressure signal to be generated and outputted through the conductive rods 83 and the metal strips 81.

In conclusion, because the pusher 47 of the oil pressure sensor 20 of the present invention can be kept in an upright posture without inclination when it is forced to move downwardly, the swing member 55 of the first signal generator 50 can be uniformly pushed by the pusher 47; accordingly, an accurate oil pressure signal can be obtained. In addition, the first and second signal generators 50 and 70 both generate the oil pressure signal through the way that the pusher 47 that is abutted with the center portion of the flexible diaphragm 45 is forced to move downwardly, such that a more accurate oil pressure signal can be obtained compared to the oil pressure sensor of prior art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil pressure sensor comprising:
   a housing;
   a pressure sensing unit mounted in the housing and provided with a top cover, a base case connected with the top cover such that an accommodation is formed between the top cover and the base case, a flexible diaphragm disposed in the accommodation, a pusher abutted with the flexible diaphragm, and an elastic piece pushable by the pusher, the pusher having a head abutted with the flexible diaphragm and a tail passing through the elastic piece;
   a first signal generator having a coil member mounted to the base case and a swing member contacted with the coil member and pushable by the tail of the pusher to curvedly slide on the coil member; and
   a first signal outputting member electrically connected with the coil member for outputting a signal corresponding to oil pressure.

2. The oil pressure sensor as claimed in claim 1, wherein the elastic piece of the pressure sensing unit comprises a through hole through which the tail of the pusher passes, and a plurality of slits in communication with the through hole.

3. The oil sensor as claimed in claim 1, wherein the swing member of the first signal generator comprises a cam pivotally connected with the base case, and an arm mounted to the cam and contacted with the coil member; the arm curvedly slides on the coil member when the cam is pushed by the tail of the pusher to swing.

4. The oil pressure sensor as claimed in claim 3, wherein the swing member comprises a coil spring sleeved onto a pivot of the cam and provided with a first leg connected to the base case, and a second leg connected to the arm such that the cam returns to an initial position upon release of an external force exerting on the cam by the pusher.

5. The oil pressure sensor as claimed in claim 1, further comprising a second signal generator having an electrical contact disposed at the base case and an electrically conductive leaf spring disposed at the base case and pushable by the pusher to contact the electrical contact.

6. The oil pressure sensor as claimed in claim 5, further comprising a second signal outputting member that is electrically connected with the second signal generator for outputting a signal corresponding to oil pressure.

* * * * *